Patented June 26, 1945

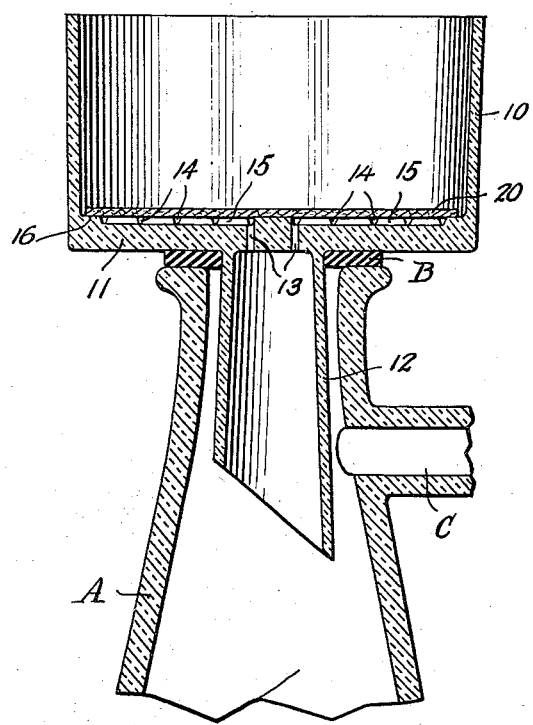
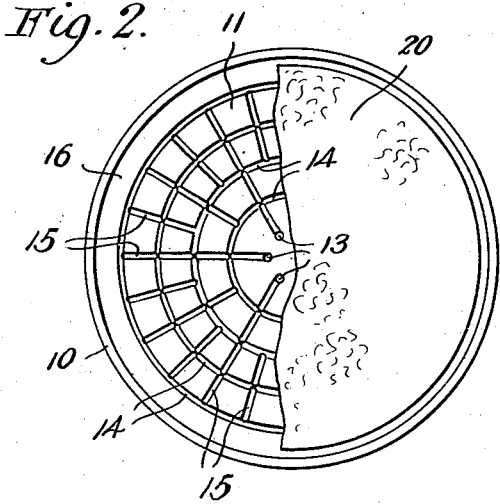
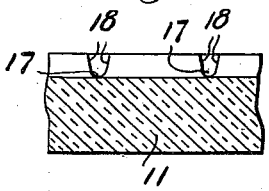

2,379,101

UNITED STATES PATENT OFFICE 2,379,101

FILTER FUNNEL

Otto W. Post, Maspeth, N. Y.

Application November 27, 1943, Serial No. 511,901

5 Claims. (Cl. 210—160)

This invention relates to filter funnels and is directed to an improvement in the type of funnels which are employed in laboratories and adapted to be used in connection with a suction flask.

Filter funnels of this type, of which the "Buchner" funnel is the most generally used, are open to numerous objections and possess many disadvantages, among which are; the difficulty experienced in effecting a thorough cleansing of all surfaces thereof; the tendency of the perforated partition wall to collapse under atmospheric pressure when used in connection with the suction flask; the restrictions or limitations imposed as to their maximum size; the inability of the same to maintain a proper sealing of the filter paper so as to preclude by-passing of the material being filtered; and the expense of production due to the intricate construction of the same.

In order to overcome the above recited objections and disadvantages, the present invention comprehends an improved filter funnel of the indicated character and for the purpose specified which is so constructed as; to render all surfaces thereof accessible for direct mechanical cleansing and visual inspection; to be capable of production in any desired size without danger of collapse under the atmospheric pressure or pressure exerted by the operator on the filtermass for extracting the liquor therefrom or while washing the filtermass to free the same of mother-liquor; and to insure proper marginal sealing of the filter paper to prevent any possibility of by-passing of the material being filtered, in addition to providing an effective supporting surface for a layer of charcoal or equivalent filtering agent spread upon the filter paper and retained by suction.

With the above enumerated and other objects in view, the invention is set forth in greater detail in the following specification, particularly pointed out in the appended claims and illustrated in the accompanying drawing, in which:

Fig. 1 is a vertical sectional view through an improved filter funnel constructed in accordance with the invention and showing the same associated with a suction flask.

Fig. 2 is a top plan view of the funnel with the filter paper partially broken away.

Fig. 3 is an enlarged fragmentary sectional view through the bottom wall of the funnel to more clearly disclose the cross sectional shape of the grooves.

Referring to the drawing by characters of reference, the improved funnel may be constructed of any suitable material but is preferably fashioned from heat resisting glass, such as "Pyrex" and the same includes a tubular or hollow cylindrical body 10 having a flat horizontally disposed bottom wall 11 of the required thickness depending upon the size of the funnel. A tubular stem 12 depends from the under side of the central portion of the bottom wall 11 and said stem is preferably of gradually increasing diameter from the upper end to its lower free end so that it flares downwardly and outwardly to facilitate the mechanical cleansing of the inner periphery thereof as well as the under surface of the bottom wall 11 which is disposed within the confines of the stem. The central portion of the bottom wall 11 is formed with an annular series of holes or perforations 13 extending vertically therethrough and which open at their upper ends through the upper surface of the bottom wall, with the lower ends of said perforations opening through the lower surface of the bottom wall 11 within the confines of the stem 12 and spaced from the inner periphery thereof.

A suitable arrangement of intercommunicating grooves which also communicate with the perforations 13 are provided in the upper surface of the bottom wall 11 and which, as illustrated, consists of a series of concentric annular grooves 14 and radial grooves 15, certain of the latter communicating with and extending radially outward from the perforations 13. An important feature of the groove arrangement is the spacing of both the annular and radial grooves from the inner periphery of the body 10 to define an endless annular sealing surface 16 located between the outermost annular groove 14 and the inner periphery of the body 10, the purpose of which will be hereinafter explained. It will also be observed that the grooves are preferably rounded at their bottoms as at 17 and have upwardly divergent side walls 18, while it should be understood that the distance which said side walls 18 are spaced apart at the upper ends must be definitely limited so as not to exceed a predetermined maximum spacing which will be hereinafter set forth.

As is customary, funnels of this type are adapted to have placed upon the upper surface of the bottom wall 11 thereof a disk or sheet of filter paper 20 which in this instance must be of slightly lesser size than the inside diameter of the body 10 so as to lie flat thereupon while the said filter paper must be of greater size than the diameter of the outermost annular groove 14 so as to completely cover all of the grooves as well as the perforations 13 thus providing a marginal sealing area extending beyond the grooves for sealing engagement with the annular sealing surface 16 of the said bottom wall 11. This will insure the passage of the liquid through the filter paper and prevent any possibility of the same by-passing the filter paper.

In use, the stem 12 of the funnel is inserted into the neck of the suction flask A with a yieldable gasket or washer B surrounding the stem and located between the lower surface of the bottom wall 11 of the funnel and the upper end surface of the flask neck. If desired, the use of the gasket or washer B may be avoided by providing cooperative ground surfaces on the under side of the bottom wall 11 of the funnel and the upper end surface of the flask neck to define a ground joint. When the material to be filtered is arranged within the funnel body 10, it rests upon the filter paper 20 so that when suction or negative pressure is applied to the interior of the flask A through the side nipple C, atmospheric pressure will be exerted upon the filtermass within the funnel body to separate or strain the liquid therefrom as it is forced through the filter paper and into the grooves 14 and 15 and thence through the perforations 13 into the flask A. It will thus be apparent due to the improved construction of the funnel that the bottom wall 11 thereof may be of the desired or necessary thickness in proportion to the size of the funnel to provide the required strength for withstanding any possible pressure which may be brought to bear thereon as a result of the suction employed or any downward force exerted thereon by the operator for pressing the liquid from the filtermass or while washing the latter to free the same of mother-liquor. The construction of the funnel is also ideal for the purpose of supporting a layer of charcoal, diatomaceous earth or other equivalent substances on the filter paper in an even horizontal layer where it is retained in place by the suction for removing very small particles which would otherwise pass through the paper alone.

As heretofore stated, the width of the grooves 14 and 15 or the distance between the side walls 18 thereof must not exceed a predetermined maximum which may be best defined as a width or distance which will not permit the spanning portions of the filter paper to be drawn into the grooves by the suction to an extent which would materially affect the free feeding of the filtered liquid therethrough.

From the foregoing it will thus be evident that after use of the funnel, the grooves 14 and 15 thereof as well as the perforations 13, the inner periphery of the stem 12 and the under side of the bottom wall 11 within the confines of the stem are clearly visible for inspection and readily accessible for mechanical cleansing to insure removal of all foreign matter therefrom prior to a subsequent use of the funnel. This is highly important and most essential in laboratory practice and which is not now possible with the present day funnels of the "Buchner" type where many of the surfaces are hidden from view and inaccessible for the purpose of direct mechanical cleansing. It should also be noted that a filter funnel constructed in accordance with the present invention effects a more rapid and thorough filtering of the filtermass than is possible with filter funnels of the "Buchner" type.

What is claimed is:

1. A filter funnel including a tubular body, an integral bottom wall therefor having a flat surface, and a tubular stem of reduced cross-sectional size relative to the body and depending from the central portion of the bottom wall, said bottom wall having an annular series of perforations extending vertically therethrough with the lower ends thereof opening through the lower surface of the bottom wall within the confines of the tubular stem and with the upper ends of said perforations opening through the upper surface of said bottom wall, the said flat upper surface of the bottom wall having a series of concentric annular grooves with the outermost groove of said series spaced inwardly from the inner periphery of the body to define an endless flat marginal sealing face, and said upper surface of the bottom wall having radial grooves communicating with the annular grooves and located in the area of said upper surface bounded by the outermost annular groove and with certain of said radial grooves communicating with the perforations.

2. In a filter funnel, a body including a circular bottom wall, an integral annular upstanding marginal wall and a downwardly and outwardly flaring tubular stem of reduced cross sectional size with reference to the marginal wall and depending from the central portion of the bottom wall and integral therewith, said bottom wall having a concentric annular series of perforations extending vertically therethrough with the lower ends thereof opening through the lower surface of the bottom wall within the confines of and spaced inwardly from the inner periphery of the stem and with the upper ends of said perforations opening through the upper surface of said bottom wall, the upper surface of the bottom wall being flat and having formed therein an arrangement of intercommunicating grooves communicating with the perforations and with said arrangement of grooves spaced from the inner periphery of the marginal wall so as to define a flat endless annular sealing face lying wholly within the confines of the funnel body so as to cooperate with the underside of a filter disk disposed wholly within said funnel body and supported upon the upper surface of the bottom wall to effect a marginal sealing of the filter disk to insure the passage therethrough of the liquid content of the material being filtered.

3. In a filter funnel, a tubular body, a bottom wall integral therewith and having a flat upper surface, and a tubular stem of reduced cross-sectional size relative to the body and depending from the under side of the central portion thereof, said central portion of the bottom wall having a perforation extending therethrough with the lower end thereof opening through the lower surface of said bottom wall and with the upper end of said perforation opening through the medial portion of the bottom wall, the upper surface of said bottom wall having a grooved area communicating with the perforation and located in spaced relation to the inner periphery of the body to define on the upper surface of said bottom wall a flat endless marginal sealing face adjacent to the inner periphery of the body and located between the same and the grooved area.

4. In a filter funnel, a cup-shaped body including a bottom wall having a flat upper surface and an upstanding integral marginal rim, and a reduced tubular stem depending from the under side of the medial portion of the bottom wall, said bottom wall having a vertically perforated central portion the lower part of which is located within the confines of the stem, the said upper surface of the bottom wall having a grooved area communicating with the perforated central portion thereof and spaced inwardly from the inner periphery of the rim to define a flat endless sealing face surrounding the grooved area and located tween the same and the grooved area.
ery of the marginal rim.

5. A filter funnel fashioned of glass and including a bottom wall having a flat upper surface, an upstanding marginal rim integral with said bottom wall, and a tubular stem integral with and depending from the underside of the bottom wall with the inner periphery of said stem flaring downwardly, the flat upper surface of the bottom wall having an intercommunicating grooved area spaced from the inner periphery of the marginal rim thereby leaving an endless sealing face surrounding the grooved area and with which is adapted to be engaged the marginal portion of the underside of a filter sheet arranged over and in flat contact with the upper surface of the bottom wall in covering relation to the grooved area with the marginal portion of said filter sheet extending beyond the grooved area for sealing engagement with the sealing face, and said bottom wall having an aperture opening through the lower surface thereof within the confines of the tubular stem with the upper end of said aperture opening into one of the grooves of the intercommunicating grooved area.

OTTO W. POST.